United States Patent [19]
Mihalko

[11] Patent Number: 5,294,855
[45] Date of Patent: Mar. 15, 1994

[54] ELECTROMOTIVE DEVICE

[75] Inventor: Emil S. Mihalko, Lansdale, Pa.

[73] Assignee: Faraday Energy Foundation, Inc., Atlanta, Ga.

[21] Appl. No.: 965,234

[22] Filed: Oct. 23, 1992

Related U.S. Application Data

[62] Division of Ser. No. 759,228, Sep. 13, 1991, Patent No. 5,197,180.

[51] Int. Cl.⁵ .......................... H02K 1/00; H02K 1/22
[52] U.S. Cl. ..................................... 310/180; 310/266
[58] Field of Search ........ 310/180, 259, 194, 198–208, 310/214, 185, DIG. 6, 266

[56] References Cited

U.S. PATENT DOCUMENTS

| | | | |
|---|---|---|---|
| 3,441,761 | 4/1969 | Painton et al. | 310/202 |
| 4,463,276 | 7/1984 | Nakamura | 310/198 X |
| 4,484,097 | 11/1984 | Kanayama et al. | 310/208 X |
| 4,556,811 | 12/1985 | Hendricks | 310/208 X |
| 4,563,808 | 1/1986 | Lender | 310/194 X |

*Primary Examiner*—Emanuel T. Voeltz
*Assistant Examiner*—E. To
*Attorney, Agent, or Firm*—Woodcock Washburn Kurtz Mackiewicz & Norris

[57] ABSTRACT

A method for making a wound field for an electric motor, generator or alternator includes the steps continuously winding an insulated conductor into a coil, having a first plurality of windings wound in a first direction, and a second plurality of windings wound in a second direction opposite the first direction; flattening the coil into a two-layered flat web, and rolling the flat, two-layered web end-to-end into a cylindrical configuration. In one embodiment, a multiphase wound field can be made by winding a plurality of insulated conductors about a common axis to form a group of adjacent coil units. After the first group of coil units is wound, second and subsequent groups can be wound, in alternating directions of winding with respect to the first group, to form an elongate winding assembly. The entire assembly, is then flattened and rolled end-to-end. This create a wound field that is ready for insertion into a magnetic return path of an electric motor which has a higher density than was previously possible. As a result, current loss due to hysteresis and other features is materially reduced.

6 Claims, 7 Drawing Sheets

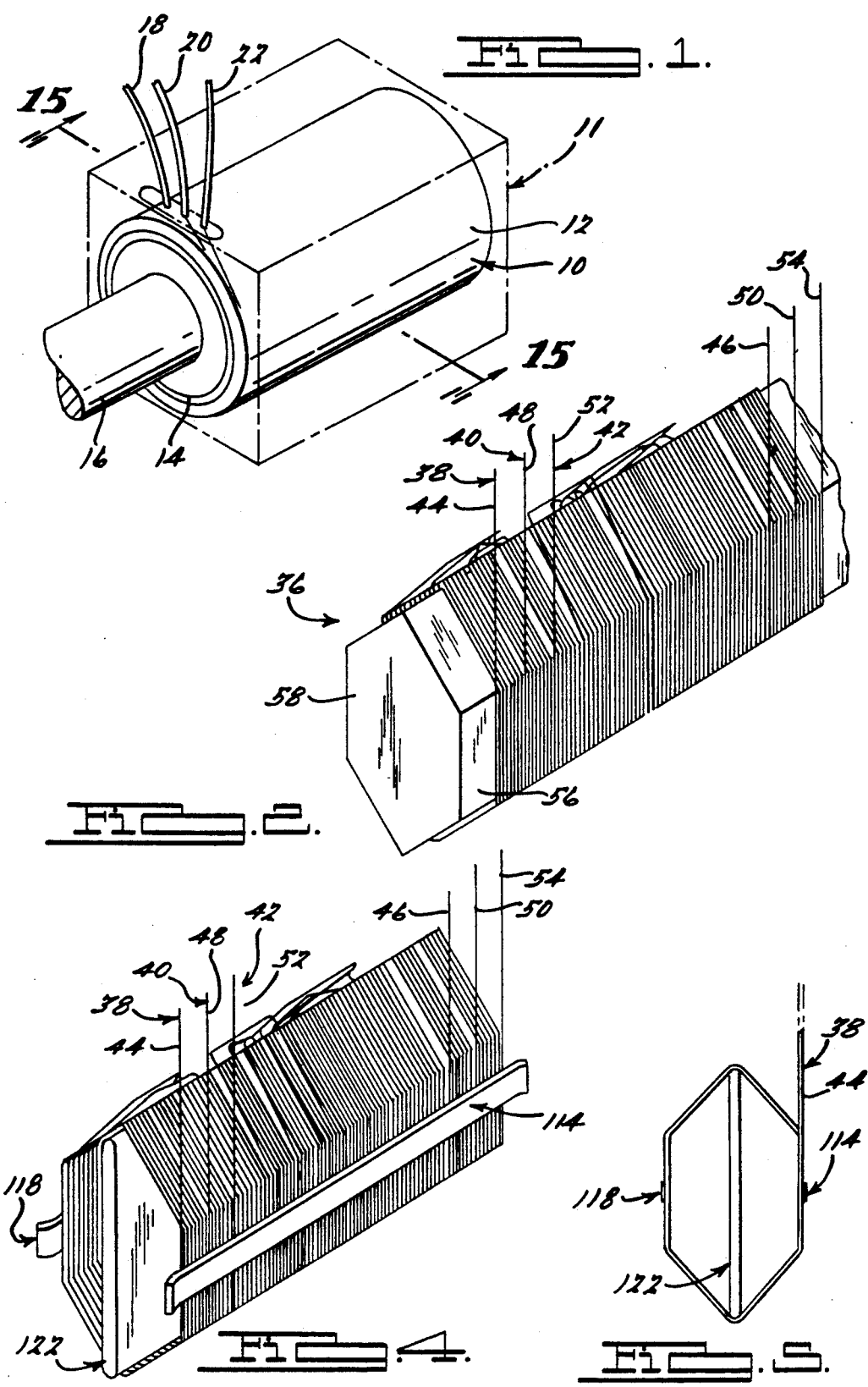

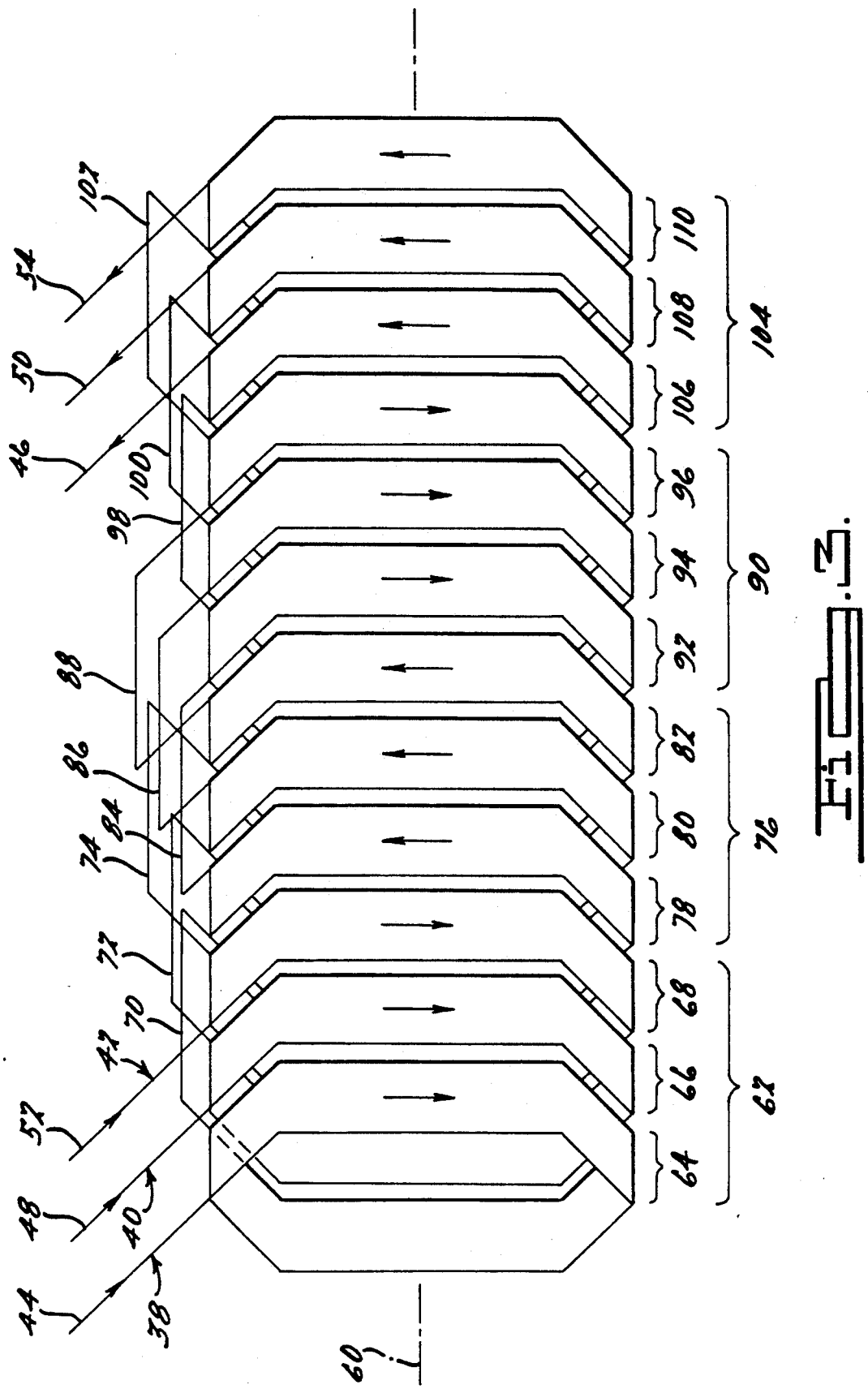

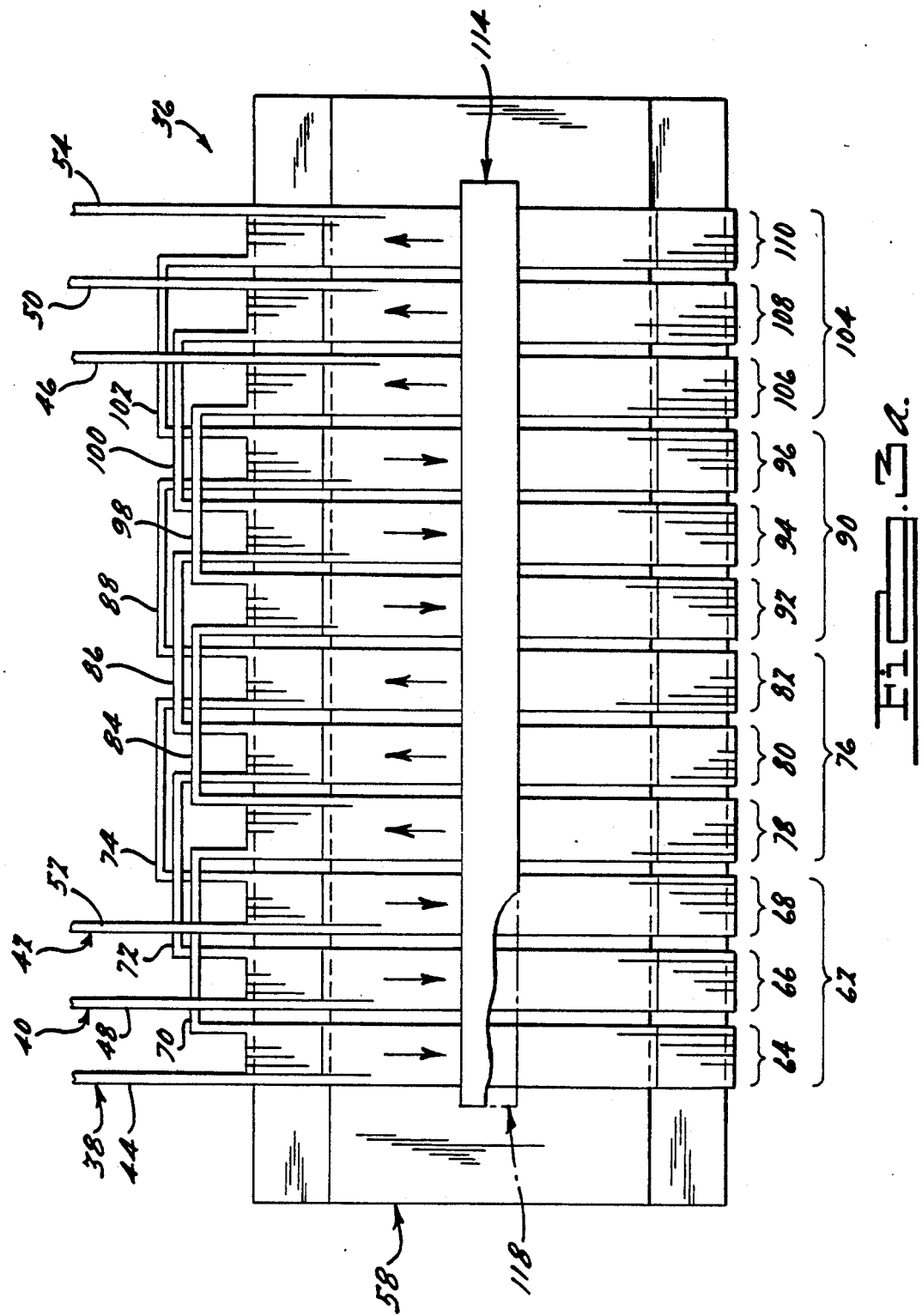

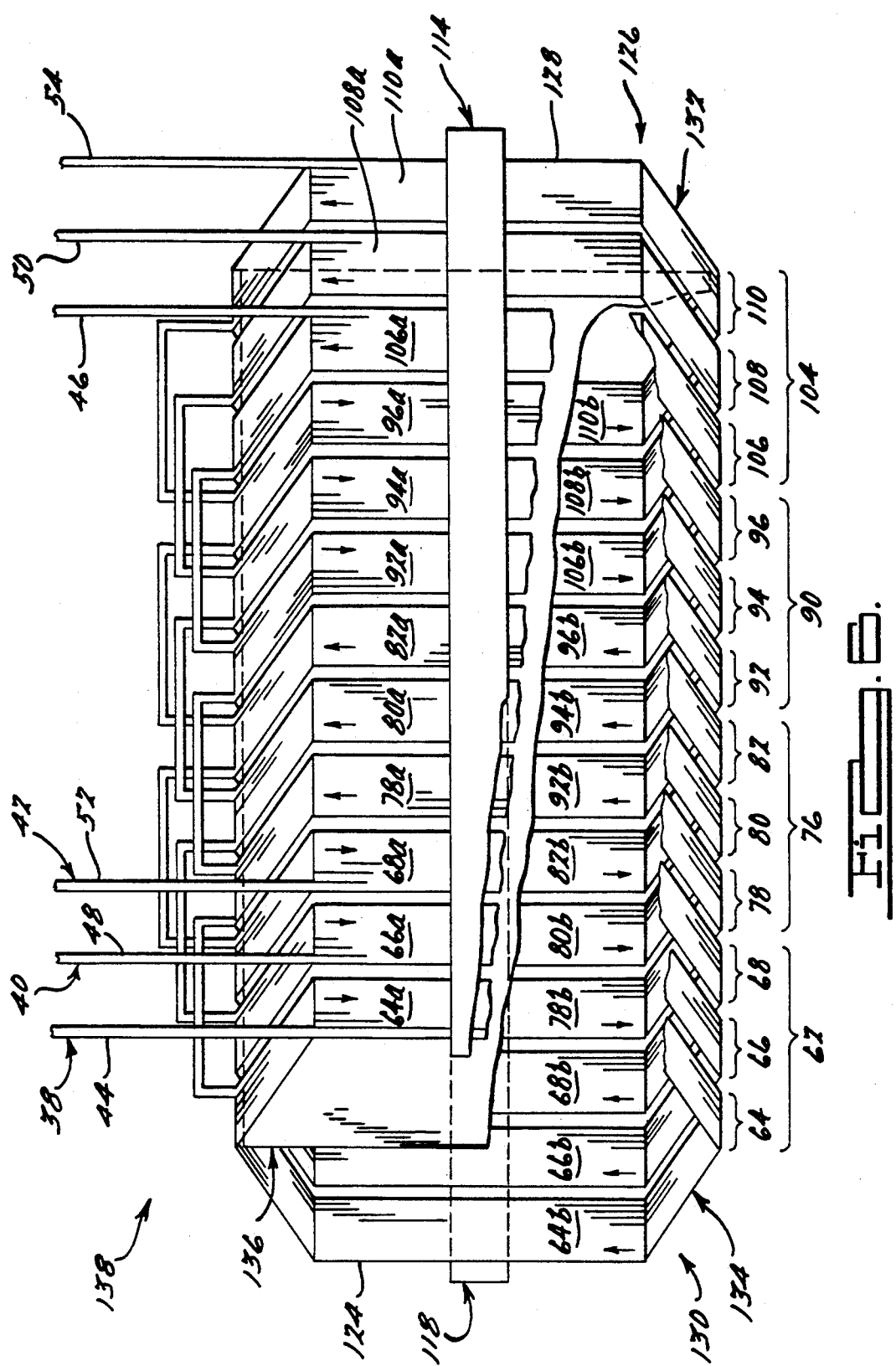

ELECTROMOTIVE DEVICE

This is a divisional of application Ser. No. 07/759,228, filed on Sep. 13, 1991, now U.S. Pat. No. 5,197,180.

BACKGROUND OF THE INVENTION

1. Field of the Invention

This invention relates broadly to the field of electrically powered motors. More specifically, this invention relates to an electric motor and a method for winding an electric motor which is simpler and less expensive to perform than previously used methods, and which results in an electric motor winding which is more power efficient than windings heretofore known.

2. Description of the Prior Art

Alternating current (AC) and direct current (DC) brushless motors conventionally have an outer stator surrounding an inner rotor, the rotor being mounted to rotate within the stator.

In most electric motors, the stator includes a number of regularly spaced radially oriented teeth along its inner periphery, which define a corresponding number of slots. The teeth and slots extend along the entire axial length of the stator. Through various techniques which are well known to those skilled in the field, electrical windings are positioned in the slots between the teeth from one end of the stator to another, and around the teeth at the opposite ends of the stator. In this manner, the electrical windings are precisely oriented with respect to the rotor so that AC or switched DC voltage applied to the windings will induce a magnetic field which has a known, predetermined orientation. The electro-magnetic field is designed to react with permanent magnets or inductive windings on the rotor to turn the rotor in a desired direction.

It can be difficult and time consuming to install the electrical windings into a slotted stator, and a fair amount of complicated machinery has been developed over the years to do this. In addition to the manufacturing difficulties presented by the slotted stator configuration, the presence of the teeth which define the slots creates magnetic discontinuities, which can affect the efficiency of the motor. In addition, the presence of the teeth limit the number of windings which can be positioned in the critical area of the stator adjacent to the rotor. This, too, adversely affects the efficiency of the motor. If the entire area on the stator which is adjacent to the rotor could be filled with conductors, motor efficiency would increase, and losses due to factors such as hysteresis would be lessened.

Other forms of motor windings which eliminate stator teeth and slots are known, but most variously require specialized coil forms, specialized winding machines to provide coils of special geometry, or specialized support structures. Such structures are expensive and complicated to manufacture. As a result, despite their known disadvantages, most electrical motors are still being manufactured with the slotted stator configuration.

It is clear that there has existed a long and unfilled need in the prior art for a slotless winding for electrical motors which is inexpensive to manufacture, which is reliable, and which results in a higher winding density than was attainable by use of a slotted winding configuration.

SUMMARY OF THE INVENTION

Accordingly, it is an object of the invention to provide a slotless winding for an electric motor which is reliable and inexpensive to manufacture.

It is further an object of the invention to provide a slotless winding configuration for an electrical motor which results in a winding density which is higher than was permitted by a slotted winding configuration.

It is further an object of the invention to provide a method for manufacturing a wound core for an electric motor which is inexpensive to perform, and which results in a slotless winding configuration which has a higher winding density than was attained by previous slotted winding configurations.

To achieve the above and other objects of the invention, a method of making a wound field for a motor, generator or alternator according to one aspect of the invention includes the steps of winding an insulated conductor into a coil having a first plurality of individual windings, wound in a first direction about an axis, and a second plurality of windings wound about the axis in a second direction opposite the first direction; compressing or flattening the coil as by reorienting the individual windings thereof relative to the axis so as to obtain a substantially flat, two-layered web having a first axial end and a second axial end wherein a peripheral section of an individual winding originally wound in the first direction overlies a corresponding diametrically-opposite peripheral section of another individual winding originally wound in the second direction; and rolling the flat web into the wound field by joining the first axial end to the second axial end.

According to a second aspect of the invention, a method of making a multiphase wound field for an electric motor, generator or alternator includes the steps of (a) simultaneously winding at least two insulated conductors about a common axis at axially-spaced intervals in a first winding direction to form a group of at least two adjacent coil units; (b) axially shifting the insulated conductor with respect to the coil units by a distance of approximately (n-1) times the axial unit of the coil width, with n being the number of conductors being wound; (c) simultaneously winding a second group of adjacent coil units as provided in step (a) in a second winding direction which is opposite the first winding direction, the second group of coil units being adjacent to the first group of coil units; (d) compressing or flattening the adjacent coil groups as by reorienting the individual windings forming the coil units thereof relative to the axis so as to obtain a substantially flat, two-layered web having a first axial end and a second axial end wherein a peripheral section of a coil unit originally wound in the first direction overlies a corresponding diametrically-opposite peripheral section of another coil unit originally wound in the second direction; and (e) rolling the flat web into a wound field by joining the first axial end to the second axial end.

According to a third aspect of the invention, an electric motor, generator or alternator according to the invention includes a rotor, and a slotless stator, the stator having a wound field which comprises at least first and second insulated conductors, the first and second conductors being wound in a first winding direction to form, respectively, first and second coil units which constitute a first coil group; the conductors being further wound in a second, opposite winding direction to form a second coil group which is adjacent to the first coil group; the wound coils being compressed and oriented as by flattening same so that a peripheral segment or "leg" of the first coil unit overlies a corresponding diametrically-opposite peripheral segment or "leg" of a coil unit in the second winding group which is also formed by the first insulated conductor, and so that a leg of the second coil unit overlies a corresponding diametrically-opposite leg of a second coil unit in the second winding group which is also formed by the second insulated conductor, whereby the overlying legs create a dense, compacted winding for generating an oriented magnetic field for driving the rotor without the disadvantages of the slotted stator configuration.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a partially diagrammatical perspective view of an electric motor constructed according to a preferred embodiment of the invention;

FIG. 2 is a perspective view depicting the first, second and third conductors wound about a mandrel, according to the invention;

FIG. 3 is an isometric schematic depicting the initial winding steps in the method according to the invention;

FIG. 3a is an enlarged side view, partially broken away, of the coils wound on the mandrel after securing their relative axial positions as with pieces of tape;

FIG. 4 is a perspective view depicting the wound coils after removing the mandrel and inserting an insert;

FIG. 5 is a end view of the wound coils shown in FIG. 4;

FIG. 6 is an enlarged top view of the wound coils of FIG. 4 after having been flattened into a two-layered web in conformance with another step in the method of the invention;

DETAILED DESCRIPTION OF THE PREFERRED EMBODIMENT(S)

Figure 7:
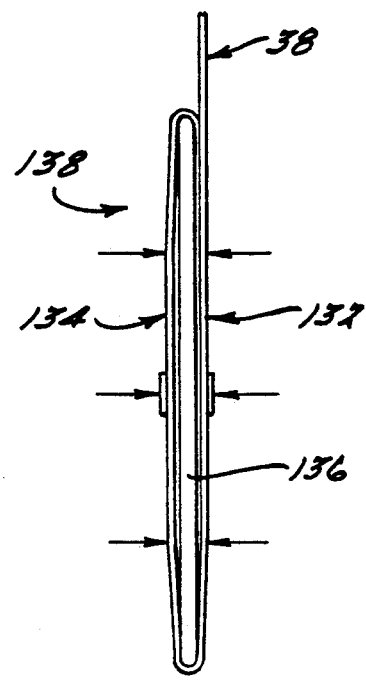
FIG. 7 is an enlarged partially diagrammatical end view depicting performance of the flattening step to obtain the flat two layered web illustrated in FIG. 6.

Referring now to the drawings, wherein like reference numerals designate corresponding structure throughout the views, and referring in particular to FIG. 1, an electric motor 10 according to the invention includes a stationary stator assembly 12 and a rotor 14 which is mounted for rotation within the stator assembly 12. As is shown in FIG. 1, motor 10 may be incorporated into a power tool assembly 11. Power tool assembly 11 can be any type of tool which can be powered by a electric motor, for example hand tools such as drills and saws, portable tools such as transportable saws, as well as stationary bench tools. Power tool assembly 11 could also be a lawnmower or other type of garden tool; the possibilities are too numerous to comprehensively list. In alternative embodiments of the invention, reference numeral 10 could refer to an electrical generator or alternator, which are very similar in construction to an electric motor.

Rotor 14 is connected to a shaft 16, which acts as a mechanical output for the energy which is converted by the electric motor 10. A number of wires 18, 20, 22 lead into the motor 10 for connection to the stator assembly 12, in a manner that will be discussed in greater detail below.

Figure 15:
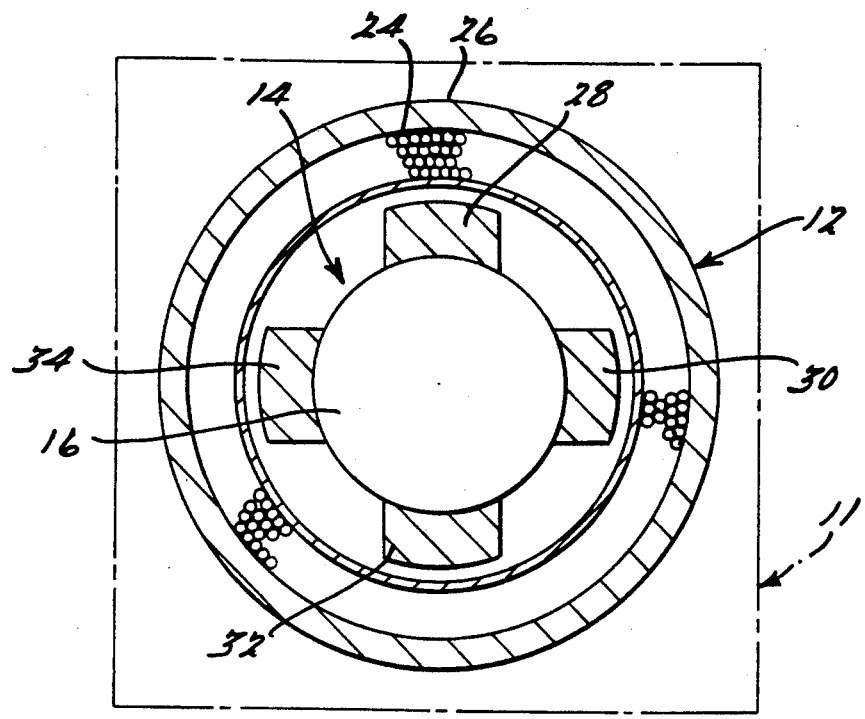
FIG. 15 is a simplified cross-sectional view of the electric motor of FIG. 1 along line 15—15 thereof.

Referring briefly to FIG. 15, which is a simplified cross-sectional view through the stator assembly 12, rotor 14 and shaft 16 of the motor 10 shown in FIG. 1, it will be seen that the inner periphery of stator assembly 12 is lined by a wound field 24. Wound field 24 is cylindrically shaped, and throughout its thickness it is nearly completely filled with conductors. It will be noted that wound field 24 is self-supporting in the sense that it does not require teeth and slots to properly orient the individual conductors therein with respect to the rotor 14. The specific construction of wound field 24 and the orientation of the conductor therein will be described in greater detail below with reference to its method of manufacturing.

As is further shown in FIG. 15, stator assembly 12 includes a magnetic return path 26 into which the wound field 24 is inserted. Magnetic return path 26 can be constructed as either a laminated ring return path, or a powder metal return path where the individual conductive particles are electrically insulated from each other, the construction of both being well known to those skilled in the field. In the embodiment illustrated in FIG. 15, rotor 14 includes four permanent magnetic poles, 28, 30, 32, 34, which are spaced at 90° intervals about the circumference and along the length of rotor 14. In the illustrated embodiment, wound field 24 and rotor 14 are constructed for operation under a three phase alternating current (AC) power input. The specific construction of rotor 14 and wound field 24 can be modified as necessitated by different types of power input, or according to known variations in electric motor construction, and still be equally within the invention.

Looking now to FIGS. 2-14, a preferred method according to the invention for manufacturing the wound field 24 and for assembling a manufactured wound field 24 into the magnetic return path 26 to form a completed stator assembly 12 will now be described. Referring first to FIGS. 2 and 3, a first step in such a process involves the fabrication of a coil assembly 36. It should be understood, however, that the following description is specific to a winding of a wound core 24 for a three phase alternating current motor. The invention applies equally to other winding configurations, the fabrication of which according to the invention may slightly differ from that which is described below.

As illustrated in FIG. 2, a first insulated conductor 38, a second insulated conductor 40, and a third insulated conductor 42 are wound about a mandrel 58. In the preferred embodiment of the invention, mandrel 58 is provided with a hexagonal outer surface 56, although other polygonal shapes having an even number of sides will work nearly as satisfactorily. First insulated conductor 38 has a first end 44 and a second end 46. Second insulated conductor 40 has a first end 48 and a second end 50. This insulated conductor 42 has a first end 52 and a second end 54, as is shown in FIGS. 2 and 3. Preferably, mandrel 58 is symmetrical in shape about an axis 60.

As is perhaps best shown in FIG. 3, the first, second, and third insulated conductors 38, 40, 42 are simultaneously wound about a first end portion of mandrel 58 in a first direction which is indicated by the downward arrows in FIG. 3 to form, respectively, a first coil unit 64, a second coil unit 66, and a third coil unit 68. This winding process can be performed by rotating the mandrel 58, or, alternatively, by leading the respective insulated conductors 38, 40, 42 mechanically about the periphery of the mandrel 58. Thus, FIG. 3 depicts the winding of the first insulated conductor 38 in a clockwise direction about the mandrel 58 to form the first coil unit 64. The second insulated conductor is also wound in the clockwise direction about mandrel 58 to form the second coil unit 66. The third insulated conductor 42 is also wound in a clockwise direction, simultaneously with the winding of the first and second coil units 64, 66, to form the third coil unit 68. In the preferred embodiment of the invention, each coil unit 64, 66, 68 constitutes eight to twelve windings of the respective insulated conductor 38, 40, 42 about the mandrel 58. Taken together, the first, second and third coil units 64, 66, 68 form what will be referred to as the first winding group 62 of coils.

Once the first group 62 of coil units has been wound, the insulated conductors 38, 40, 42 are shifted axially with respect to the axis 60 of mandrel 58 for a distance of approximately twice the width of one of the coil units 64, 66, 68. These axial shifts of the three insulated conductors 38, 40, 42 are illustrated in FIG. 3 as 70, 72, 74 respectively. The first shift 70 of the first insulated conductor 38 will position the insulated conductor 38 immediately adjacent to the last winding in the third coil unit 68, as is shown in FIG. 3. The first axial shift 72 of the second insulated conductor 40 will be spaced approximately the width of one coil unit farther along the mandrel 58 from where the first shift 70 of the first conductor 38 terminates, and the first shift 74 of the third conductor 42 will be spaced an additional coil unit width along the mandrel from where the shift 72 of the second conductor 40 terminates. Thus, the insulated conductors 38, 40, 42 are positioned to wind a second group 76 of coil units.

The second group 76 of coil units is wound in a second direction which is opposite to the direction in which the first group 62 of coil units was wound. In the embodiment shown in FIG. 3, the second group 76 of coil units is wound in a counterclockwise direction, as represented by the upward arrows. To wind the second group 76 of coil units, the first, second, and third insulated conductors 38, 40, 42 are simultaneously wound in a counterclockwise direction for the same number of turns that was used to wind the first group 62 of coil units. As a result, first insulated conductor 38 will form a fourth coil unit 78, second insulated conductor 40 will form a fifth coil unit 80, and third insulated conductor 42 will form a sixth coil unit 82. Once the coil units 78, 80, 82 are wound, the insulated conductors 38, 40, 42 are axially shifted a second time for a distance approximately equal to two coil unit widths, so as to position the conductors 38, 40, 42 for the winding of a third coil unit group 90. Thus, the first insulated conductor 38 takes a second axial adjustment 84, the second insulated conductor 40 takes a second axial adjustment 86, and the third insulated conductor 48 takes a second axial adjustment 88. To wind the third group 90 of coil units, the insulated conductors 38, 40, 42 are wound in the same direction as the first group 62 of coil units was wound, which is opposite to the direction which the second group 76 of coil units was wound. In the illustrated embodiment, the third group 90 of coil units is wound in a clockwise direction, as indicated by the downward arrows in FIG. 3. The first, second, and third insulated conductors 38, 40, 42 are simultaneously wound for the same number of turns that the first and second coil groups 62, 76 were wound. As a result, first insulated conductor 38 forms a seventh coil unit 92, second insulated conductor 40 forms an eighth coil unit 94 and third insulated conductor 42 forms a ninth coil unit 96.

At this point, the insulated conductors, 38, 40, 42 again simultaneously take an axial shift which is approximately equal to the width of two coil units. The third axial shift of first insulated conductor 38 is represented by reference numeral 98 in FIG. 3. The third axial shift of second conductor 40 is represented by the reference numeral 100, and the third axial shift of insulated conductor 42 is represented by the reference numeral 102 in FIG. 3. Once the insulated conductors 38, 40, 42 are thus positioned, a fourth group 104 of coil units is wound, in a direction which is the same as the direction in which the second coil group 76 was wound. In the embodiment shown in FIG. 3, this is a counterclockwise winding, in which the first insulated conductor 38 forms a tenth coil unit 106, the second insulated conductor 40 forms an eleventh coil unit 108, and the third insulated conductor 42 forms a twelfth coil unit 110. After the fourth coil group 104 is wound, the second ends 46, 50, 54 of the respective conductors 38, 40, 42 are extended from the formed winding assembly 36 for later connection after the wound core 24 has been fabricated, as will be described in greater detail below.

Referring now to FIGS. 3a, 4 and 5, a structure is applied to the formed winding assembly 36 to permit removal of the winding assembly 76 from the hexagonal mandrel 58 without deforming the shape or the respective relationship of the coils within the winding assembly 36. Preferably, the securing structure takes the form of at least two strips 114 and 118 of adhesive tape, which are applied longitudinally with respect to the axis of the mandrel 58 along opposite outer surfaces of the winding assembly 36. As is shown in FIG. 3a, the first strip 114 of adhesive tape is applied longitudinally along one outer surface of the assembly 36. The second strip 118 is applied to a outer surface of the winding assembly 36 which is diametrically opposed from the outer surface to which the first strip 114 has been applied. At this point, the winding assembly 36 is removed from the mandrel 58.

After the winding assembly 36 has been removed from the mandrel 58, an insert 122 is preferably inserted within the winding assembly 36, as seen in FIGS 4 and 5. Insert 122 is most preferably a strip formed of a "B" stageable fiberglass with an epoxy coating, and preferably has a width which is just slightly less than the maximum distance between two of the vertices in the hexagonally shaped inner periphery of the winding assembly 36.

Referring now to FIGS. 6 and 7, the secured winding assembly 36 with the insert 122 therein is then flattened, to form a substantially flat two-layered web 138 which has a first axial end 124 defined by the first coil unit 64 and a second axial end 128 defined by the twelfth coil unit 110. As is best shown in FIG. 7, the flat, two-layered web 138 includes a first layer 132 and a second layer 134 which is opposed from the first layer 132. A core 136 formed by the insert 122 is positioned between the first and second layer 132, 134.

As may be seen in FIG. 6, the flattening step is conducted so that the first layer 132 of the web 138 is axially displaced relative to the second layer 134 to the extent that a leading, single-layered web portion 126 is formed at the second axial end 128 of the web 138, and that a trailing, single-layered web portion 130 is formed at the first axial end 124 of the web 138. Preferably, this displacement occurs to the extent that the leading single-layered web portion 126 at the web's second axial end 128 is formed exclusively of the axially-leading peripheral segments or legs 106a, 108a, 110a (hereinafter "leading legs" 106a, 108a, 110a) of the coil units 106, 108, 110 comprising the fourth coil group 104 as seen in FIG. 6; and so that the trailing single layered web portion 130 at the web's first axial end 124; is formed exclusively of the axially-trailing peripheral segments or legs 64b, 66b, 68b (hereinafter "trailing legs" 64b, 66b, 68b of the coil units 64, 66, 68 comprising the first coil group 62.

As a result, the leading legs 64a, 66a, 68a of the individual coil units 64, 66, 68 within the first coil group 62 are displaced to the extenT that the leading leg 64a of the first coil unit 64 will overlie the trailing leg 78b of the oppositely-wound fourth coil unit 78; and the leading leg 66a of the second coil unit 66 will overlie the trailing leg 80b of the oppositely-wound fifth coil unit 80 and the leading leg 68a of the third coil unit 68 will overlie the trailing leg 82b of the oppositely-wound sixth coil unit 82. Similarly, the leading legs 78a, 80a, 82a of the fourth, fifth, and sixth coil units 78, 80, 82 of the second coil group 76 are displaced so as to overlie the trailing legs 92b, 94b, 96b of the oppositely-wound seventh, eighth, and ninth coil units 92, 94, 96, respectively. The leading legs 92a, 94a 96a of the seventh, eighth, and ninth coil units 92, 94, 96 are likewise displaced so as to overlie the trailing legs 106b, 108b, 110b of the oppositely wound tenth, eleventh, and twelfth coil units 106, 108, 110, respectively. As will be seen in the subsequent assembly step described with reference to FIG. 8, the leading legs 106a, 108a, 110a of the tenth, eleventh, and twelfth coil units 106, 108, 110 are likewise displaced so that they may ultimately overlie the trailing legs 64b, 66b, 68b of the oppositely-wound first, second and third coil units 64, 66, 68, upon the joining together of the first and second ends 124, 128 of the web 138.

As a result, after having joined together the ends 124, 128 of the web 138, each of the leading legs 64a, 78a, 92a, 106a wound from the first insulated conductor 38 will overlie a trailing leg 78b, 92b, 106b, 64b of the next successive, oppositely-wound coil unit which is also wound from the first insulated conductor 38. Each of the leading legs 66a, 80a, 94a, 108a wound from the second insulated conductor 40 will overlie, a trailing leg 80b, 94b, 108b, 66b of the next successive, oppositely-would coil unit which is also wound from the second insulated conductor 40. Similarly, each of the leading legs 68a, 82a, 96a, 110a wound from the third insulated conductor 42 will overlie a trailing leg 82b, 96b, 110b, 68b of the next successive, oppositely-wound coil unit which is also wound from that conductor. This ensures that the currents in overlying coil unit legs will be flowing in the same direction and, thus, result in a compatible, mutually-reinforcing electro-magnetic field. It should be noted that this will occur regardless of the particular wire connection arrangement that is applied to the winding.

In other embodiments of the invention, a winding can be fabricated from fewer or more than the three insulated conductors that are depicted in the preferred, illustrated embodiment. In such cases, the number of coil units in a particular winding group will correspond to the number of conductors that are being used. Upon compaction, it is essential that the leading leg of a particular coil unit overlie the trailing leg of a coil unit which is wound from the same insulated conductor, but in the opposite direction. This will ordinarily be achieved if the singled-layered web portion 126 is formed of the leading legs of the first coil group in the winding assembly, and if the singled-layered web portion 130 is formed of the trailing legs of a last coil group in the winding assembly.

Figure 8:
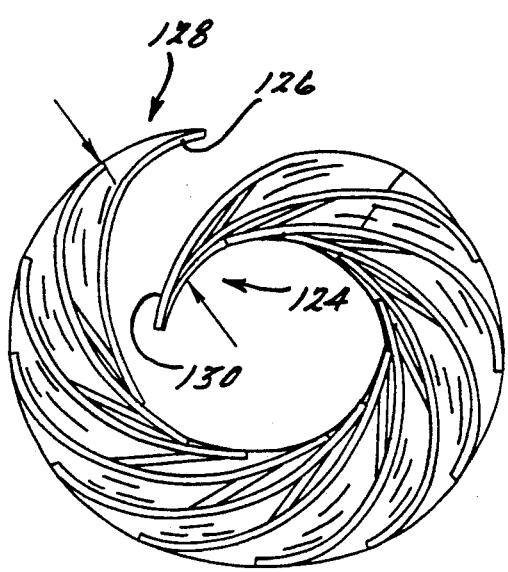
FIG. 8 is a partially diagrammatical endview depicting formation of the wound field by joining the ends of the flat two-layered web.

Referring now to FIG. 8, the flat web 138 is rolled end-to-end, so that the leading singled-layered web portion 126 at its second axial end 128 overlies the trailing single-layered web portion 130 at the first axial end 124. As a result, a wound field 24 having a nearly perfect cylindrical shape is created.

Figure 9:
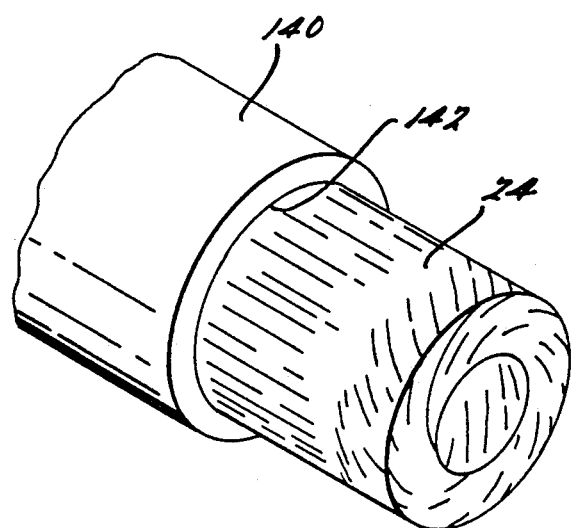
FIG. 9 is a partially diagrammatical fragmentary perspective view depicting the insertion of the wound field into a preformed magnetic return path.

Looking now to FIG. 9, the cylindrical wound field 24 is then inserted into a cylindrical space defined by an inner wall 142 of a preformed magnetic return path 140. A pre-preg epoxy cloth can optionally be inserted between the wound field 24 and the inner wall 142 of the return path 140 to insulate the inner wall 142 from the wound field 24. Alternatively, the inner wall 142 can be coated with an epoxy powder to achieve the electrical insulation between the return path 140 and the wound field 24.

Figure 10:
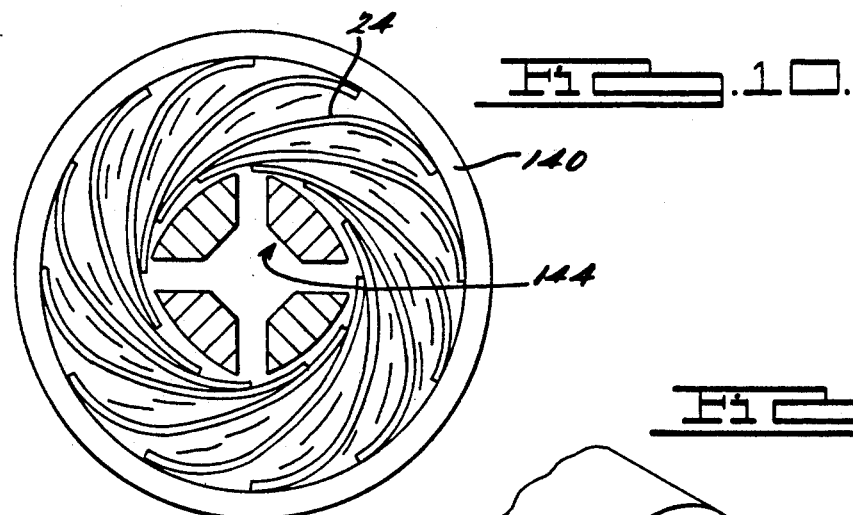
FIG. 10 is a partially diagrammatical end view depicting the wound field in the magnetic return path after insertion of an expandable arbor thereinto.
Figure 11:
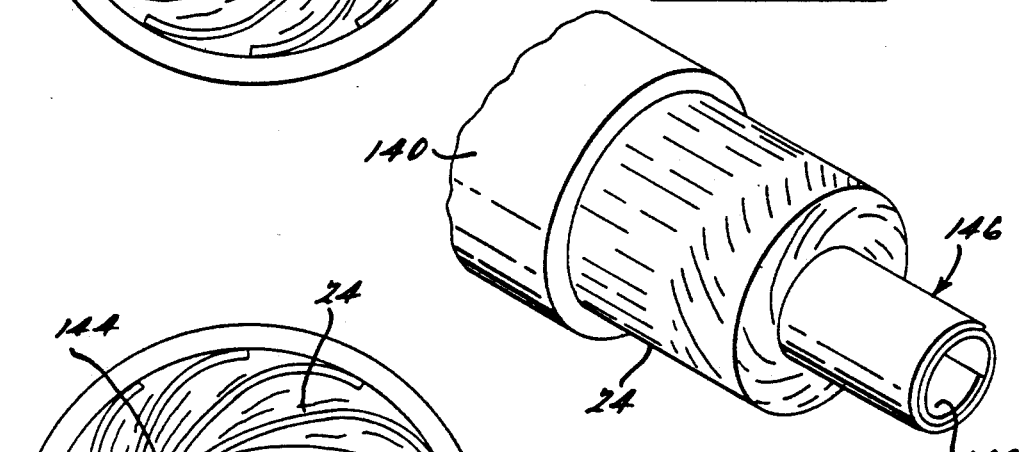
FIG. 11 is a partially diagrammatical fragmentary perspective view depicting the insertion of an inner cylinder into the wound field subsequent to its compaction.
Figure 12:
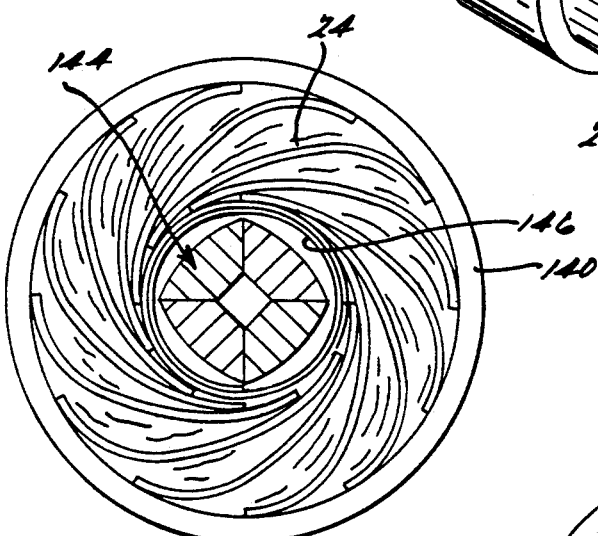
FIG. 12 is a partially diagrammatical end view showing an expandable arbor inserted into the inner cylinder prior to expanding the cylinder against the compacted wound field (while further compressing same)
Figure 13:
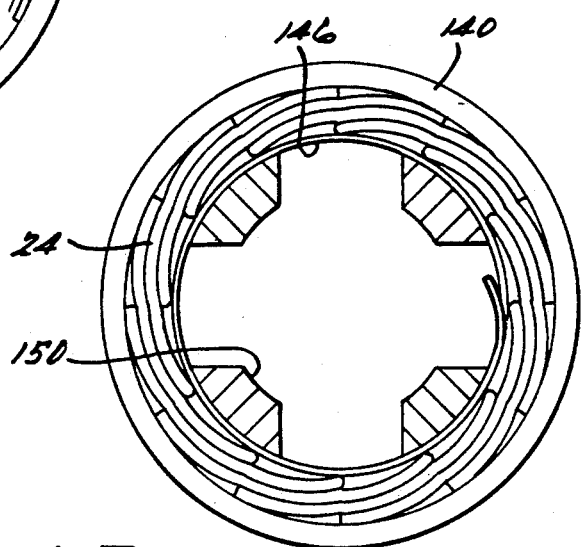
FIG. 13 is a partially diagrammatical end view depicting the structure illustrated in FIG. 12 after the arbor has expanded the inner cylinder against the further compacted wound field.
Figure 14:
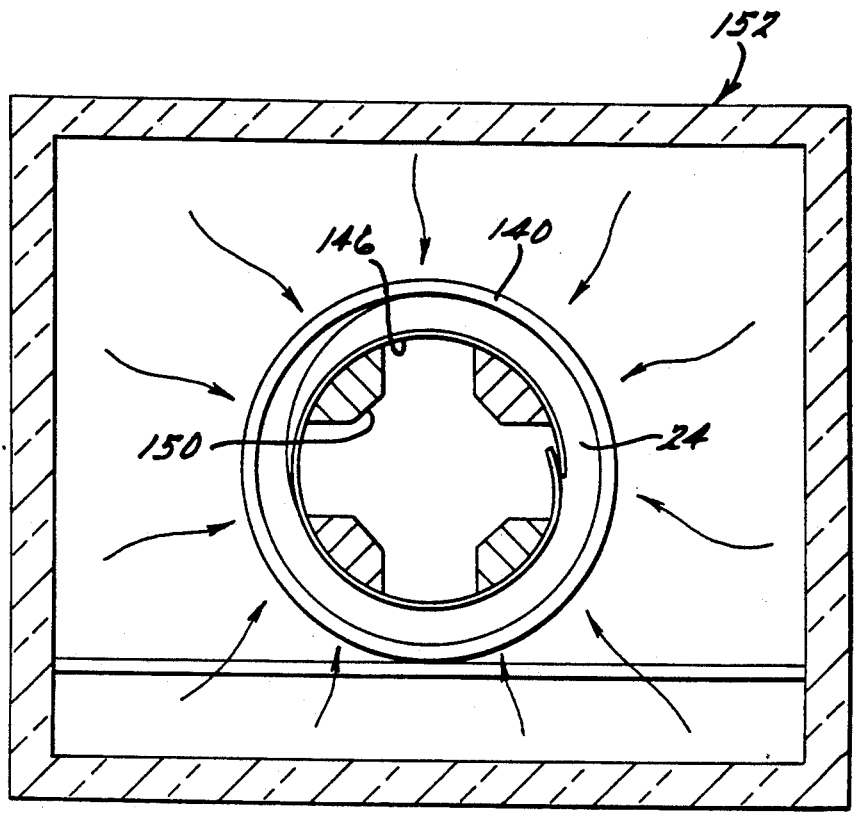
FIG. 14 is a diagrammatical view depicting the heating of the structure illustrated in FIG. 13.

Once the wound field 24 has been inserted into the return path 140, an expandable arbor 144 is inserted into the space defined by the inner periphery of the wound field 24, as is shown in FIG. 10. The arbor 144 is then expanded, thus compacting the wound field 24 tightly against the inner wall 142 of the magnetic return path 140. After this expansion has been performed, the arbor 144 is removed, and a cylinder 146 which is fabricated from an epoxy fiberglass pre-preg material is inserted into the expanded space defined by the inner periphery of the wound field 24. This process is illustrated in FIG. 11. Once the cylinder 146 has been inserted into the wound field 24, the expandable arbor 144 is reinserted into the space defined by an inner surface 148 of the cylinder 146. This process is illustrated in FIG. 12. At this point, the expandable arbor is then expanded, thus expanding the cylinder 146 and again compressing the wound field 24 against the inner wall 142 of the magnetic return path 140. The second expansion step is depicted by FIG. 13. Once this is done, the entire assembly, including the expandable arbor 144 and its expanded legs 150, is inserted into an oven 152 or an equivalent heating apparatus. At this point, heat is applied to cure the expanded cylinder 146, and the core 136 of the wound field 24. Once this is completed, the stator assembly 12 is ready for assembly into an electric motor 10. Alternatively, the heat curing process could be achieved through electric resistance heating.

Once the electric motor 10 has been so fabricated, it can be installed into a power tool assembly 11, or into whatever type of apparatus in which a high efficiency electric motor can be used.

Alternatively, the method according to the invention could be used to manufacture an electrical generator or alternator, which are structurally very similar to motors.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electric motor, generator of alternator comprising:
    a rotor; and
    a slotless stator, said stator having a wound field which comprises at least one continuous insulated conductor, said at least one conductor having a first plurality of individual windings wound in a first winding direction about a mandrel to form a first coil unit in a first winding group, and a second plurality of windings wound in a second winding direction about the mandrel opposite the first direction to form a second coil unit in a second winding group which is adjacent to the first group, an insert being located within said first and second winding groups in place of said mandrel, and said first and second winding groups being flattened to obtain a substantially flat, two-layered web having a first end and a second end, wherein a peripheral section of said first coil unit overlies a corresponding diametrically-opposite peripheral section of said second coil unit, and the first end of said web is joined to the second end.

2. An electric motor, generator or alternator according to claim 1, wherein said at least one insulated conductor comprises three continuous insulated conductors, said three insulated conductors each being wound in said first winding direction to form three axially spaced coil units in said first winding group, and being wound in said second winding direction to form three axially spaced coil units in said second winding group, wherein said first and second winding groups are flattened so that a peripheral section of a coil unit in said first winding group formed from one of said three insulated conductors overlies a diametrically-opposite peripheral section of a coil unit formed from the same insulated conductor in said second winding group.

3. An electrically powered tool for performing work on a work piece, comprising:
    a tool element; and
    means for driving said tool element, said driving means comprising an electric motor which includes a rotor; and a slotless stator, said stator having a wound field which comprises at least one continuous insulated conductor, said at least one conductor having a first plurality of individual windings wound in a first winding direction about a mandrel to form a first coil unit in a first winding group, and a second plurality of windings wound in a second winding direction about the mandrel opposite the first direction to form a second coil unit in a second winding group which is adjacent to the first group, an insert being located within said first and second winding groups in place of said mandrel, and said first and second winding groups being flattened to obtain a substantially flat, two-layered web having a first end and a second end, wherein a peripheral section of said first coil unit overlies a corresponding diametrically-opposite peripheral section of said second coil unit, and the first end of said web is joined to the second end.

4. A tool according to claim 3, wherein said at least one insulated conductor comprises three continuous insulated conductors, said three insulated conductors each being wound in said first winding direction to form three axially spaced coil units in said first winding group, and being wound in said second winding direction to form three axially spaced coil units in said second winding group, wherein said first and second winding groups are flattened so that a peripheral section of a coil unit in said first winding group formed from one of said three insulated conductors overlies a diametrically-opposite peripheral section of a coil unit formed from the same insulated conductor in said second winding group.

5. A multiphase wound field for use as a slotless stator in an electric motor, generator or alternator, comprising:
    a substantially flat, two-layered web having a first axial end joined to a second axial end, said flat two-layered web comprising:
    a first plurality of individual coil units formed from a plurality of insulated conductors wound in a first winding direction;
    a second plurality of individual coil units formed from said plurality of insulated conductors wound in a second winding direction, at least one of the coil units in said second plurality of individual coil units being adjacent at least one of the coil units in said first plurality of individual coil units, wherein respective coil units in said first and said second plurality of coil units are flattened relative to each other so that a peripheral section of each respective coil unit in said first plurality of coil units overlies a diametrically-opposite peripheral section of a corresponding coil unit in said second plurality of coil units.

6. A wound field for a multiphase electric motor, generator or alternator, said wound field comprising at least two continuous insulated conductors, each of said insulated conductors forming one of a first like number of adjacent coil units wound in a first direction, each of said conductors also forming one of a second like number of adjacent coil units wound in a second direction opposite the first direction, each of said coil units having a first peripheral segment and a second peripheral segment diametrically-opposite the first peripheral segment thereof, the coil units being oriented such that the first peripheral segment of a coil unit wound in the first direction overlies the second peripheral segment of a coil unit wound in a second direction, and the first peripheral segment of a coil unit wound in the second direction overlies the second peripheral segment of a coil unit wound in the first direction.

* * * * *